(12) United States Patent
Koizumi

(10) Patent No.: US 8,579,472 B2
(45) Date of Patent: Nov. 12, 2013

(54) ILLUMINATION LENS

(75) Inventor: Fumiaki Koizumi, Nagano (JP)

(73) Assignee: Nittoh Kogaku K.K. (JP)

( * ) Notice: Subject to any disclaimer, the term of this patent is extended or adjusted under 35 U.S.C. 154(b) by 0 days.

(21) Appl. No.: 13/280,858

(22) Filed: Oct. 25, 2011

(65) Prior Publication Data

US 2012/0113653 A1 May 10, 2012

(30) Foreign Application Priority Data

Nov. 4, 2010 (JP) .................................. 2010-247763

(51) Int. Cl.
*F21V 7/04* (2006.01)
*F21V 5/04* (2006.01)

(52) U.S. Cl.
USPC ............................ 362/308; 362/309; 362/329

(58) Field of Classification Search
USPC .................................. 362/307–309, 326–329
See application file for complete search history.

(56) References Cited

U.S. PATENT DOCUMENTS

| 7,401,948 B2 * | 7/2008 | Chinniah et al. .............. 362/326 |
| 7,934,858 B2 | 5/2011 | Nakamura |
| 8,120,048 B2 * | 2/2012 | Chen et al. ...................... 257/95 |

FOREIGN PATENT DOCUMENTS

| JP | 61-147585 A | 7/1986 |
| JP | 04-36588 B2 | 6/1992 |
| JP | 2004-356512 A | 12/2004 |

* cited by examiner

*Primary Examiner* — Thomas Sember
(74) *Attorney, Agent, or Firm* — Cantor Colburn LLP

(57) ABSTRACT

The present invention provides an illumination lens which suppresses a change of an illuminance distribution following a change of an arrangement position of a light source with respect to the illumination lens. A reflection surface and emission surface of the illumination lens are configured to refract and emit, in the emission surface, second illumination light and third illumination light with refracting power of different signs. By changing an illuminance distribution of third illumination light to cancel the change of an illuminance distribution of the second illumination light when a light source is moved, it is possible to suppress the change of the illuminance distribution small even when the light source is moved back and forth.

4 Claims, 8 Drawing Sheets

ILLUMINATION LENS

CROSS-REFERENCE TO RELATED APPLICATION

The present application claims priority from Japanese Patent Application No. 2010-247763 filed on Nov. 4, 2010, the contents of which are incorporated in the present application by reference.

BACKGROUND OF THE INVENTION

1. Field of the Invention

The present invention relates to an illumination lens.

2. Description of Related Art

JP 2004-356512 A, U.S. Pat. No. 7,934,858 B, and JP 4-36588 B for example propose illumination lenses for making an illuminance uniform in an illuminated surface of light radiated from LED (Light Emitting Diode) light source.

However, a conventional illumination lens is configured to provide a desired illuminance distribution when a light source is arranged at a specific position with respect to the illumination lens. Therefore, when the light source is not arranged at a specific position with respect to the illumination lens, there is a problem that a desired illuminance distribution cannot be provided.

It is therefore an object of the present invention to provide an illumination lens which suppresses a change of an illuminance distribution following a change of an arrangement position of a light source with respect to the illumination lens.

SUMMARY OF THE INVENTION

To achieve the above object, according to the present invention, an illumination lens on which light radiated from a light source is incident and which controls distribution of the incident light to emit, has: an incidence surface through which the light radiated from the light source is incident on an interior of the illumination lens; a reflection surface which reflects part of the light incident on the interior of the illumination lens from the incidence surface, toward an illumination direction; and an emission surface which emits the light from the incidence surface and the reflection surface, toward the illumination direction, and the incidence surface comprises an opening portion which is formed on a side on which the light source is arranged such that the light from the light source can enter, and a first incidence surface and a second incidence surface which are formed in an inner surface of a concave portion dented in a direction opposite to a direction in which the light source is arranged; the first incidence surface is arranged in a bottom surface of the concave portion and comprises a convex surface on the light source side to condense the light from the light source; the second incidence surface is an inside surface formed in a surrounding of an optical axis of the illumination lens in the convex portion such that the light from the light source can transmit toward the reflection surface; the reflection surface is a total reflection surface which totally reflects the light incident on the interior of the illumination lens from the second incidence surface, toward the illumination direction; the emission surface comprises a first emission surface which comprises a center portion intersecting the optical axis, and a second emission surface which is arranged in a surrounding of the first emission surface; refracting power of light in the second emission surface comprises zero or a different sign from refracting power of light in the first emission surface; the light incident from the first incidence surface is emitted from the first emission surface; and part of the light reflected on the reflection surface is emitted from the second emission surface and other part is emitted from the first emission surface.

Further, with the illumination lens according to the present invention, a relationship between degrees of a first beam amount which is a beam amount of the light which is incident from the first incidence surface and emitted from the first emission surface, a second beam amount which is a beam amount of the light which is reflected on the reflection surface and emitted from the second emission surface and a third beam amount which is a beam amount of the light which is reflected on the reflection surface and emitted from the first emission surface is preferably second beam amount > third beam amount > first beam amount.

Still further, with the illumination lens according to the present invention, a diameter of the first emission surface is preferably greater than a diameter of the first incidence surface.

According to the illumination lens of the present invention, it is possible to provide an illumination lens which suppresses a change of an illuminance distribution following a change of an arrangement position of a light source with respect to the illumination lens.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
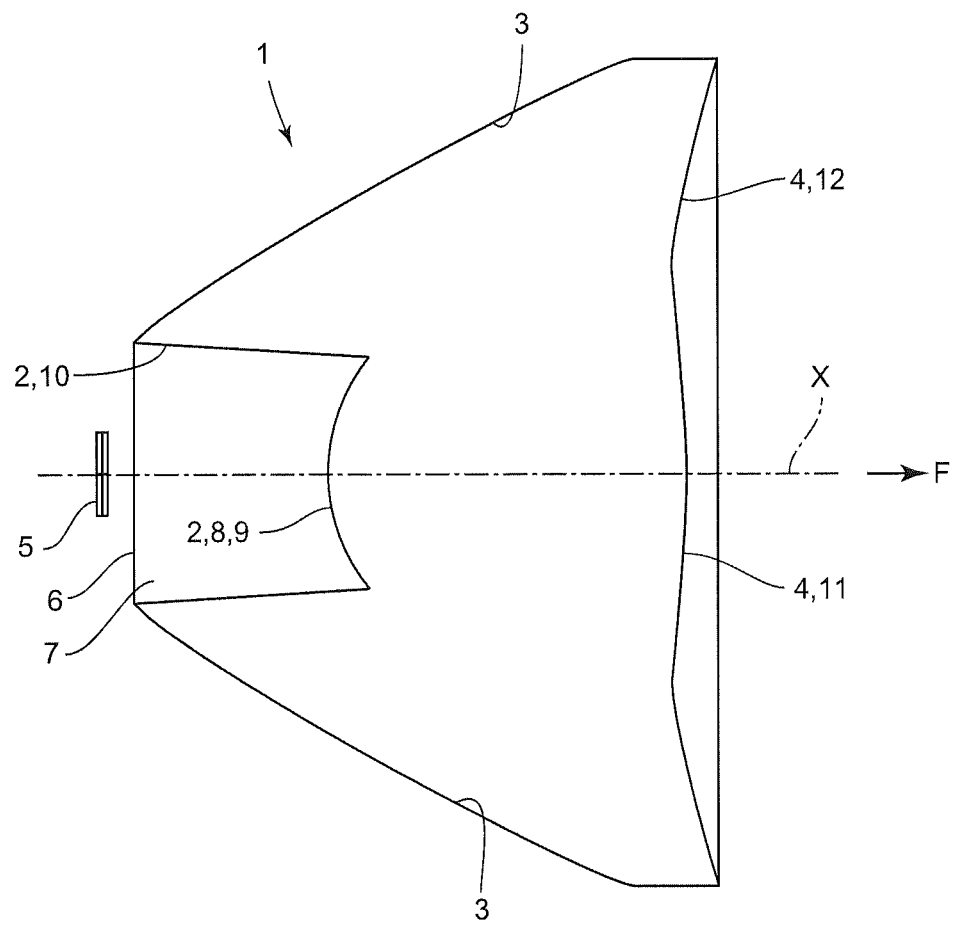
FIG. 1 is a sectional view illustrating a configuration of an illumination lens according to an embodiment of the present invention.

Hereinafter, a configuration of an illumination lens 1 according to an embodiment of the present invention will be described with reference to the drawings. FIG. 1 is a sectional view illustrating a configuration of the illumination lens 1 according to the embodiment of the present invention in a surface including an optical axis X. The illumination lens 1 has a shape made by rotating the cross section illustrated in FIG. 1 using the optical axis X as a rotary axis. In FIG. 1, the direction of an arrow F is an illumination direction of the illumination lens 1, and is a side on which an illuminated surface (not illustrated) is positioned. In the following description, the direction of the arrow F is a traveling direction of light or the fore (front side), and the opposite side is the rear (back side).

The illumination lens 1 is a solid member including an incidence surface 2, a reflection surface 3 and an emission surface 4, and is made of a transparent material (lens material) such as acrylic resin, polycarbonate resin or glass. The illumination lens 1 is configured to take light radiated from a light source 5 arranged on the optical axis X, in the illumination lens 1 through the incidence surface 2, and reflect part of light which is taken, on the reflection surface 3 toward the emission surface 4 and emit the other part of light directly from the emission surface 4 toward the fore. In addition, an LED can be used for the light source 5.

[Incidence Surface 2]

The illumination lens 1 has a bell shape which orients the curved surface backward, and, at a position including the top portion of the bell shape, a concave portion 7 having an opening portion 6 which opens rearward is formed. The space inside the concave portion 7 has a nearly circular cone which is dented from the opening portion 6 to the fore and has a diameter which becomes smaller from the back to the fore. In a bottom surface 8 of the concave portion 7, a condenser lens surface 9 which orients a convex surface backward is formed as a first incidence surface. Further, an inside surface 10 of the concave portion 7 is arranged to surround the optical axis X and is formed as the second incidence surface. That is, the incidence surface 2 has the condenser lens surface 9 and inside surface 10, and part of light radiated from the light source 5 is incident on the interior of the illumination lens 1 from the condenser lens surface 9 and the other part of light is incident on the interior of the illumination lens 1 from the inside surface 10.

[Reflection Surface 3]

The reflection surface 3 has a planar shape of a rotating body which has the center of the curvature on the optical axis X and in which a curve without the inflection point is rotated about the optical axis X, and forms an outside surface of the illumination lens 1. The reflection surface 3 is formed in a planar shape which can totally reflect light incident on the interior of the illumination lens 1 from the inside surface 10, toward the emission surface 4.

[Emission Surface 4]

The emission surface 4 has a condenser lens surface 11 as a first emission surface, and a concave lens surface 12 as a second emission surface. The condenser lens surface 11 has an intersection portion with the optical axis X, and has a concave surface formed forward. The concave lens surface 12 is arranged in the surrounding of the condenser lens surface 11 and has a concave surface formed denting rearward. When seen from the front, the condenser lens surface 11 has a shape which occupies a circular area arranged on the center portion side of the emission surface 4. By contrast with this, when seen from the front, the concave lens surface 12 is arranged on the outer periphery side of the emission surface 4 to surround the condenser lens surface 11, and has a shape which occupies an annular belt area.

[Beam Route]

Figure 2:
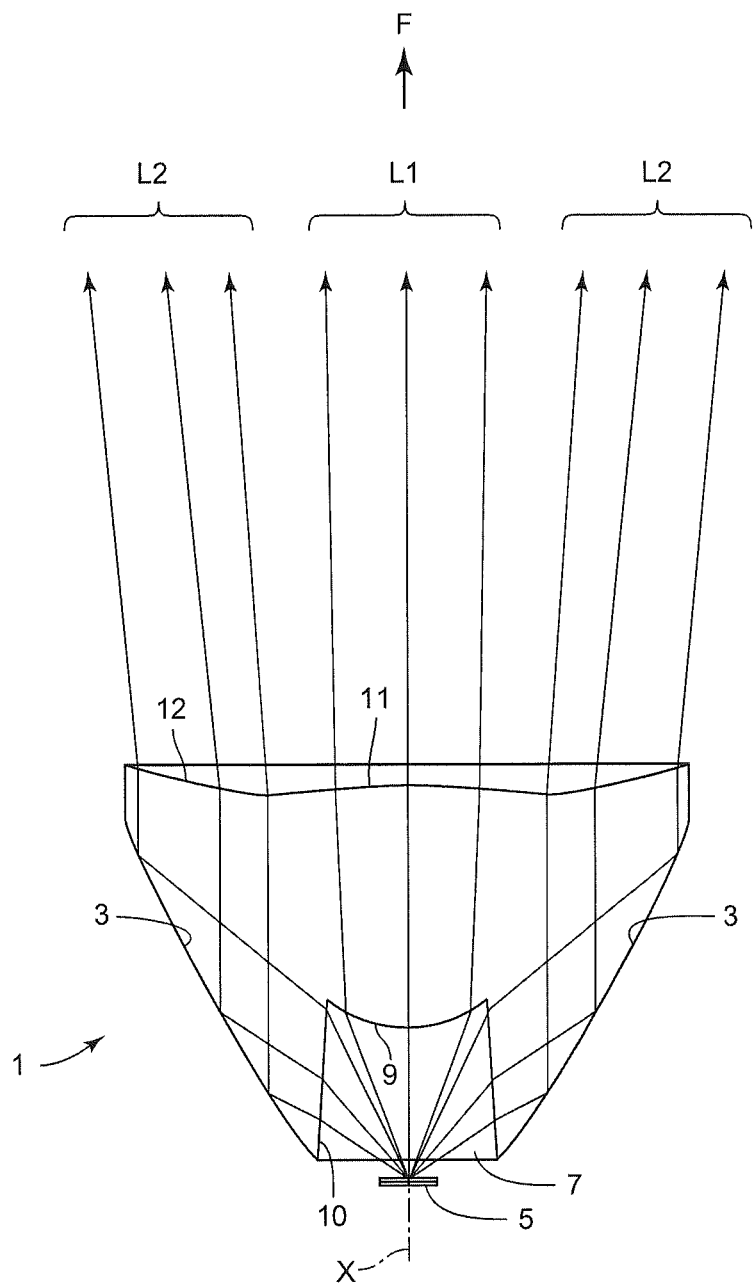
FIG. 2 is a view illustrating beam paths of lights which transmit the illumination lens illustrated in FIG. 1.
Figure 3:
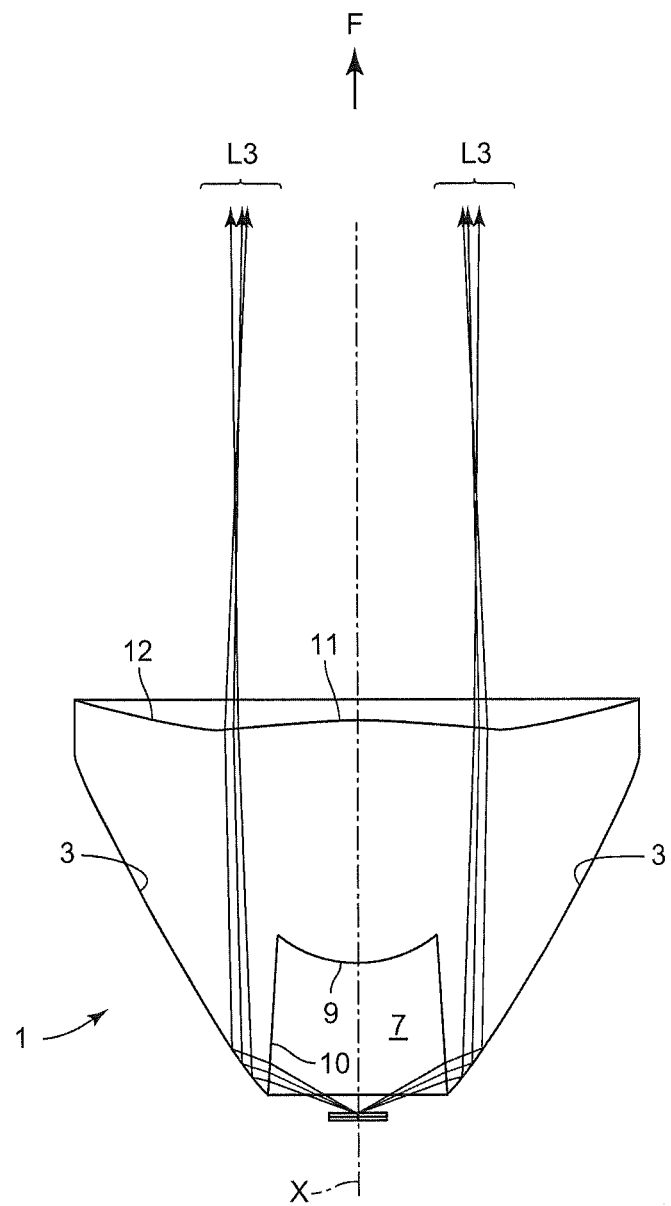
FIG. 3 is a view illustrating beam paths of lights which transmit the illumination lens illustrated in FIG. 1

The illumination lens 1 is formed with, for example, the incidence surface 2, reflection surface 3 and emission surface 4 to emit light radiated from the light source 5 forward in an optical path illustrated in FIG. 2 and FIG. 3. As illustrated in FIG. 2, part of light which is radiated from the light source 5 and enters the concave portion 7 is incident on the condenser lens surface 9, and the other part of the light is incident on the inside surface 10. Light incident on the condenser lens surface 9 is emitted forward from the condenser lens surface 11. For ease of description, light which is incident on the condenser lens surface 9 and is emitted from the condenser lens surface 11 is described as "first illumination light L1". The condenser lens surface 9 and condenser lens surface 11 are both convex lenses, and the first illumination light L1 is condensed by the condenser lens surface 9 and condenser lens surface 11 and is emitted from the condenser lens surface 11 as light of a nearly parallel light flux.

By contrast with this, light incident on the inside surface 10 is totally reflected on the reflection surface 3, and part of totally reflected light is emitted forward from the concave lens surface 12. For ease of description, light which is incident on the inside surface 10, is totally reflected on the reflection surface 3 and emitted from the concave lens surface 12 is described as "second illumination light L2". The reflection surface 3 and concave lens surface 12 emit from the concave lens surface 12 the second illumination light L2 as light of a light flux which is slightly spread.

Further, part of light totally reflected on the reflection surface 3 is emitted forward from the concave lens surface 12 as described above, and part of the other light is emitted as converged light forward from the condenser lens surface 11 as illustrated in FIG. 3. For ease of description, light which is incident on the inside surface 10, is totally reflected on the reflection surface 3 and emitted from the condenser lens surface 11 is described as "third illumination light L3". The reflection surface 3 and condenser lens surface 11 can emit from the condenser lens surface 11 the third illumination light L3 as light of a light flux which is slightly condensed.

That is, part of light which is incident on the inside surface 10 and is totally reflected on the reflection surface 3 is emitted from the concave lens surface 12 as the second illumination light L2 of spread light which is slightly spread, and the other part of light is emitted as the third illumination light L3 of converged light which is slightly converged. That is, the reflection surface and emission surface are configured to refract and emit in the emission surface the second illumination light L2 and third illumination light L3 with refractive powers of different signs. In addition, the emission angle of the second illumination light L2 from the concave lens surface 12 and the emission angle of the third illumination light L3 from the condenser lens surface 11 depend on the incident and reflection angles in the inside surface 10 and the incidence and reflection angles in the reflection surface 3. Hence, with the present embodiment, the inner space of the concave portion 7 is a nearly circular cone of a small diameter, the inner space is not limited to the circular cone, and the inner space of the concave portion 7 may have a columnar shape and the inside surface 10 may be a surface parallel to the optical axis X.

[Illuminance Distribution]

Figure 4A:
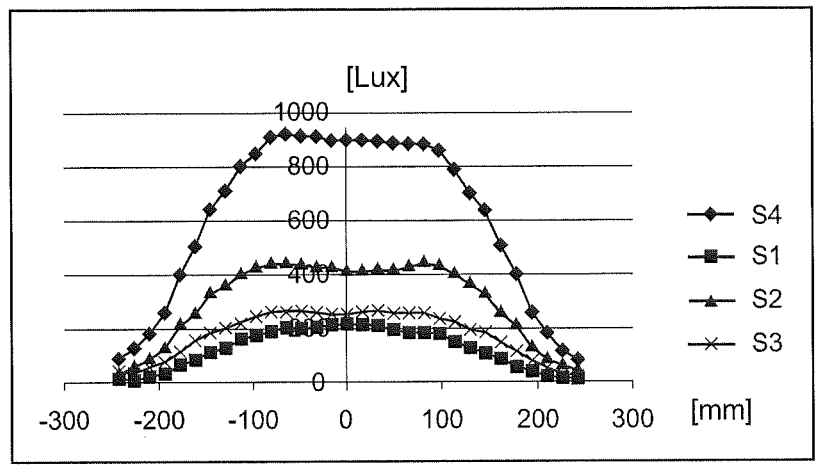
FIGS. 4A-C are views illustrating a change of an illuminance distribution of illumination light when the light source is moved back and forth with respect to the illumination lens illustrated in FIG. 1.
Figure 4B:
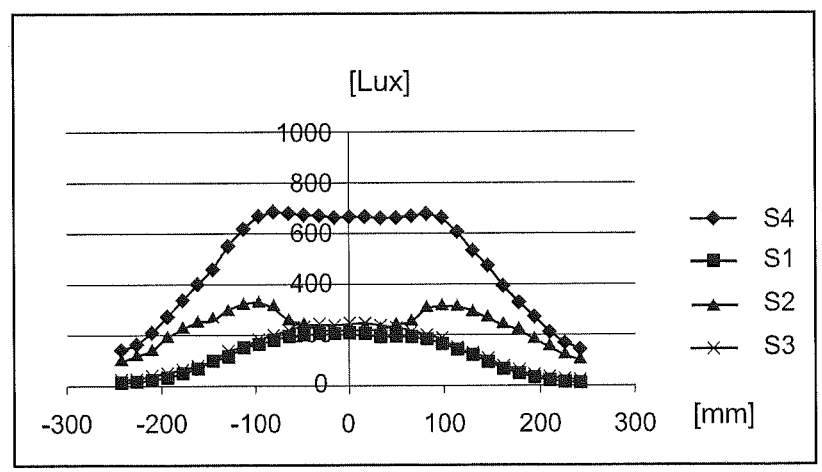
Figure 4C:
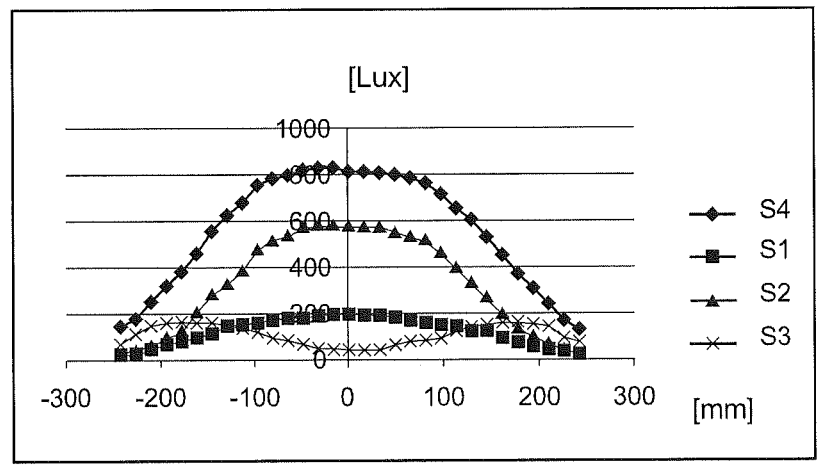

Next, a change of an illuminance distribution of illumination light when an arrangement of the light source 5 is moved back and forth with respect to the illumination lens 1 will be described with reference to FIG. 4. In addition, the vertical axis of the graph illustrated in FIG. 4 indicates an illuminance, and the horizontal axis indicates the distance from the optical axis X. The upper part (A) of FIG. 4 illustrates an illuminance distribution resulting from the configuration in design of the illumination optical system using the illumination lens 1. That is, for example, the configuration of the illumination lens 1, the distance between the light source 5 and illumination lens 1 and the distance between the illumination lens 1 and illuminated surface are set to provide an illuminance distribution in the upper part (A) of FIG. 4. The middle part (B) of FIG. 4 illustrates an illuminance distribution in the illuminated surface when the light source 5 is arranged rearward compared to the position of the light source 5 corresponding to the upper part (A). Further, the lower part (C) of FIG. 4 illustrates an illuminance distribution in the illuminated surface when the light source 5 is arranged forward compared to the position of the light source 5 corresponding to the upper part (A). In FIG. 4, the illuminance distribution for the first illumination light L1 is an illuminance distribution S1, the illuminance distribution for the second illumination light L2 is an illuminance distribution S2 and the illuminance distribution for the third illumination light L3 is an illuminance distribution S3, and the illuminance distribution when each illumination light is synthesized is an illuminance distribution S4.

Figure 5A:
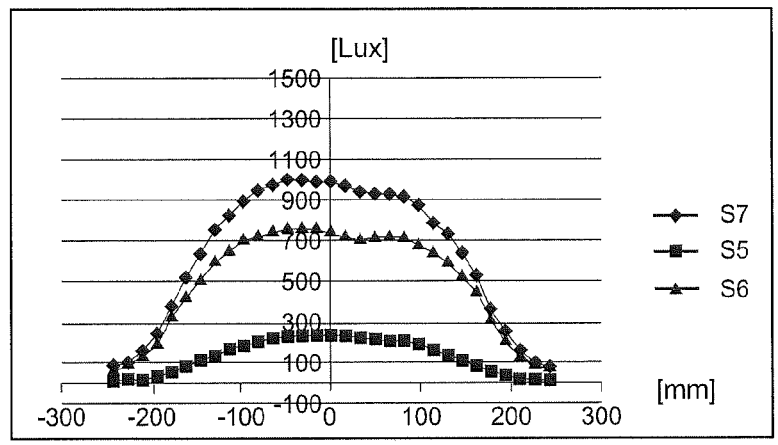
FIGS. 5A-C are views illustrating a change of an illuminance distribution of illumination light when the light source is moved back and forth with respect to a conventional illumination lens.
Figure 5B:
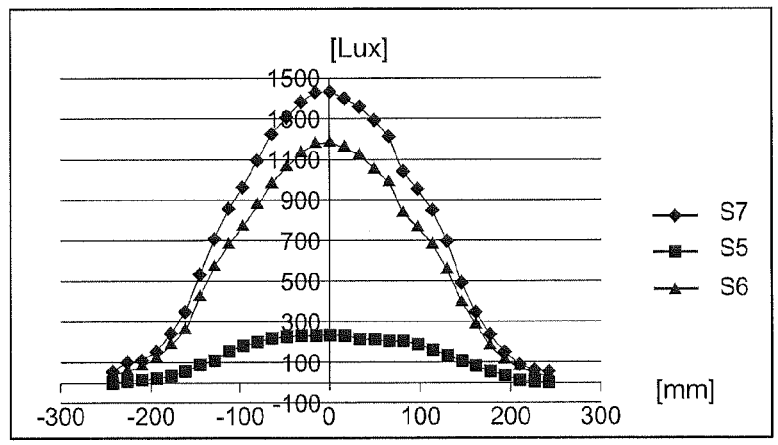
Figure 5C:
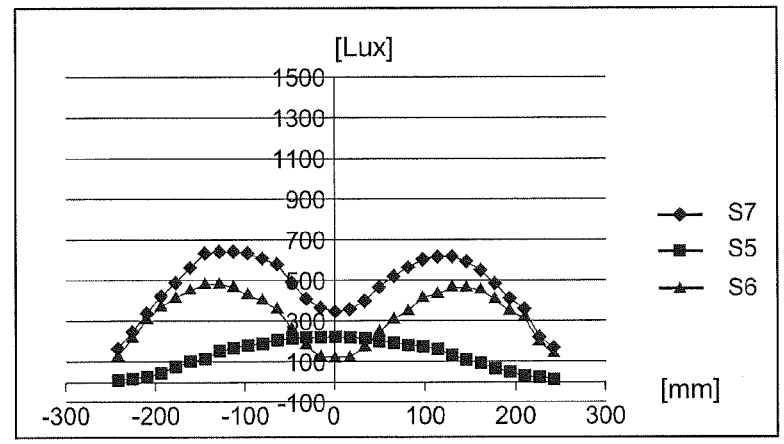
Figure 6:
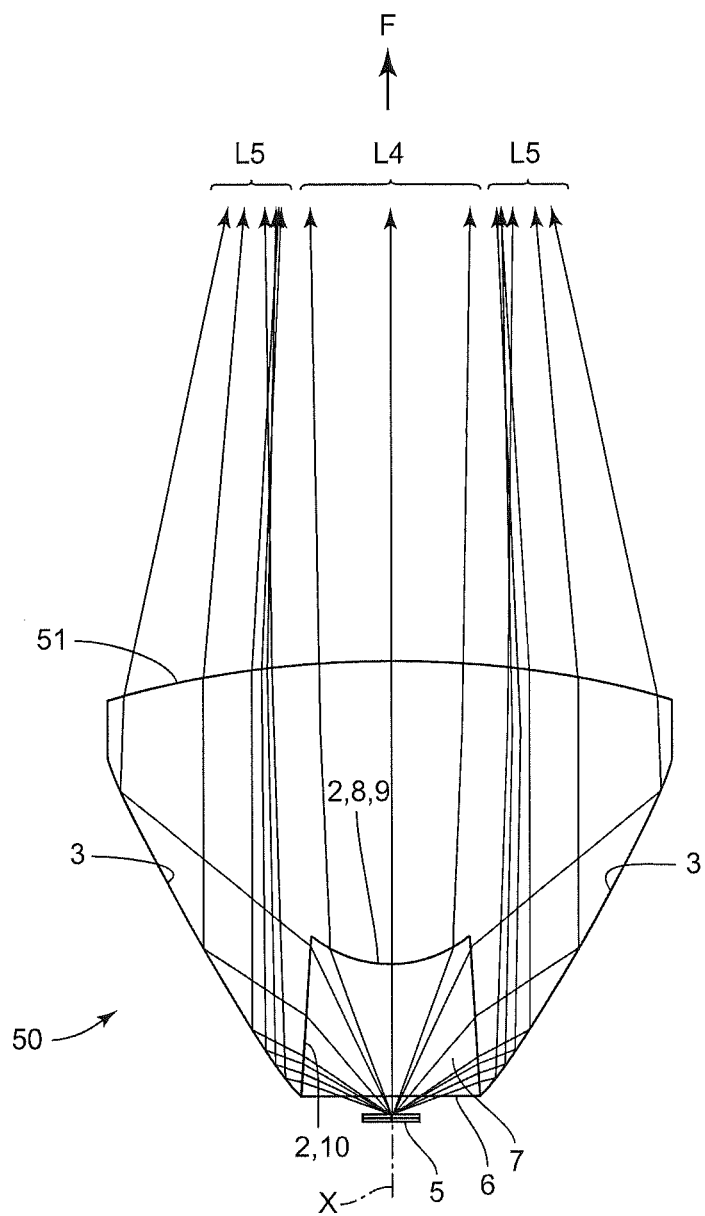
FIG. 6 is a view illustrating a configuration of the conventional illumination lens.

FIG. 5 illustrates a change of an illuminance distribution in the illuminated surface of illumination light when an arrangement of the light source 5 is moved back and forth with respect to an illumination lens 50 using the conventional illumination lens 50 illustrated in FIG. 6 as an illumination lens for comparison instead of the illumination lens 1. The illumination lens 50 illustrated in FIG. 6 employs the same configuration as the illumination lens 1 except that an emission surface 51 is different from the emission surface 4 of the illumination lens 1. Hence, the same components of the illumination lens 50 illustrated in FIG. 6 as the illumination lens 1 will be assigned the same reference numerals as the illumination lens 1, and description thereof will not be repeated.

Similar to FIG. 4, the upper part (A) of FIG. 5 illustrates an illuminance distribution resulting from design of an illumination optical system using the illumination lens 50. That is, for example, the configuration of the illumination lens 50, the distance between the light source 5 and illumination lens 50 and the distance between the illumination lens 50 and illuminated surface are set to provide an illuminance distribution in the upper part (A) of FIG. 5. The middle part (B) of FIG. 5 illustrates an illuminance distribution in the illuminated surface when the light source 5 is arranged rearward compared to the position of the light source 5 corresponding to the upper part (A) of FIG. 5. Further, the lower part (C) of FIG. 5 illustrates an illuminance distribution in the illuminated surface when the light source 5 is arranged forward compared to the position of the light source 5 corresponding to the upper part (A) of FIG. 5.

As illustrated in FIG. 6, the entire body of the emission surface 51 of the illumination lens 50 is formed as a condenser lens surface. Fourth illumination light L4 which is incident on the condenser lens surface 9 and is emitted from the emission surface 51 is condensed by the condenser lens surface 9 and emission surface 51, and is emitted from the emission surface 51 as light of a nearly parallel light flux. Further, fifth illumination light L5 which is incident on the inside surface 10, is totally reflected on the reflection surface 3 and is emitted from the emission surface 51 is emitted from the emission surface 51 as converged light. In FIG. 5, the illuminance distribution for the fourth illumination light L4 is an illuminance distribution S5, and an illuminance distribution for the fifth illumination light L5 is an illuminance distribution S6. Further, the illuminance distribution when the fourth illumination light L4 and fifth illumination light L5 are synthesized is an illuminance distribution S7.

As illustrated in the upper part (A), middle part (B) and lower part (C) of FIG. 5, the illuminance distribution of illumination light from the illumination lens 50 significantly changes by moving the light source 5. For example, as illustrated in the middle part (B) in FIG. 5, the illuminance distribution when the light source 5 arranged at a position matching the illuminance distribution in the upper part (A) in FIG. 5 is moved rearward has an increased degree of condensation of the fifth illumination light L5 on the optical axis X. Hence, with the illuminance distribution S6, the illuminance on the optical axis X side becomes significantly high, and, as a result, also with the illuminance distribution S7, the illuminance becomes significantly high on the optical axis X side. By contrast with this, as illustrated in the lower part (C) of FIG. 5, with the illuminance distribution when the light source 5 arranged at a position matching the illuminance distribution in the upper part (A) of FIG. 5 is moved forward, while the degree of condensation of the fifth illumination light L5 is low on the optical axis X side, the degree of condensation of the fifth illumination light L5 at a position spaced apart from the optical axis X is high. Hence, with the illuminance distribution S6, the illuminance is significantly high on the periphery side spaced apart from the optical axis X, and, as a result, also with the illuminance distribution S7, the illuminance is low on the optical axis X side and the illuminance on the periphery side spaced part from the optical axis X is high. That is, the illuminated surface is illuminated to form a bright annular portion.

By contrast with this, as illustrated in the upper part (A), middle part (B) and lower part (C) of FIG. 4, with the illuminance distribution S4 of illumination light from the illumination lens 1, even if the light source 5 is moved, the change of the illuminance distribution is suppressed smaller than the change of the illuminance distribution of illumination light from the illumination lens 50. For example, as illustrated in the middle part (B) of FIG. 4, with the illuminance distribution when the light source 5 arranged at a position matching the illuminance distribution of the upper part (A) of FIG. 4, is moved rearward, while the illuminance of second illumination light L2 is low on the optical axis X side, the illuminance is high at a position on the periphery side spaced apart from the optical axis X. By contrast with this, while the illuminance of the third illumination light L3 on the optical axis X side is high, the illuminance on the periphery side spaced apart from the optical axis X is low. Hence, compared to the change of the illuminance distribution S7 illustrated in the upper part (A) and middle part (B) of FIG. 5 using the illumination lens 50, the degree of the change of the illuminance distribution S4 illustrated in the upper part (A) and middle part (B) of FIG. 4 using the illumination lens 1 is smaller.

Further, as illustrated in the lower part (C) of FIG. 4, with the illuminance distribution when the light source 5 arranged at a position matching the illuminance distribution in the upper part (A) of FIG. 4, the illuminance of the second illumination light L2 is high on the optical axis X side. Further, the illuminance of the first illumination light L1 is slightly high at a position on the periphery side spaced apart from the optical axis X. Further, while the illuminance of the third illumination light L3 is low on the optical axis X side, the illuminance at the position on the periphery side spaced apart from the optical axis X is high. Hence, compared to the change of the illuminance distribution illustrated in the upper part (A) and lower part (C) of FIG. 5 using the illumination lens 50, the degree of the change of the illuminance distribution S4 illustrated in the upper part (A) and lower part (C) of FIG. 4 using the illumination lens 1 is smaller.

That is, the reflection surface and emission surface are configured to refract and emit in the emission surface the second illumination light L2 and third illumination light L3 with refractive powers of different signs. Therefore, following movement of the light source 5, distribution of the second illumination light L2 and third illumination light L3 is biased in different directions. That is, following movement of the light source 5, distribution of one of the second illumination light L2 and third illumination light L3 is biased in a converging direction, and the distribution of the other one is biased in a spreading direction. By this means, the illuminance distribution S3 of the third illumination light L3 changes to cancel the change of the illuminance distribution S2 of the second illumination light L2 when the light source 5 is moved. Hence, even when the light source 5 is moved back and forth, the change of the illuminance distribution S4 in which the first illumination light L1, second illumination light L2 and third illumination light L3 are synthesized is suppressed smaller. That is, the condensed lens surface 11 and concave lens surface 12 are formed in the emission surface 4, and light which is incident from the condenser lens surface 9 is emitted as the first illumination light L1 from the condenser lens surface 11, part of light which is incident on the inside surface 10 and is reflected on the reflection surface 3 is emitted as the second illumination light L2 from the concave lens surface 12 and the other part of light is emitted as the third illumination light from the condenser lens surface 11, so that it is possible to suppress a change of the illuminance distribution S4 following movement of the light source 5 in the back and forth directions.

In addition, a beam amount A of the first illumination light L1, a beam amount B of the second illumination light L2 and a beam amount C of the third illumination light L3 are beam amount B> beam amount C> beam amount A, so that it is possible to adequately suppress the change of the illuminance distribution S4 which occurs following movement of the light source 5 in the back and forth directions. Further, beam amount B> beam amount C> beam amount A holds and the beam amount C is equal to or more than 20% and equal to or less than 30% of the sum of the beam amount A, beam amount B and beam amount C, so that it is possible to more adequately suppress the change of the illuminance distribution S4 which occurs following movement of the light source 5 in the back and forth directions.

[Main Effects of Present Embodiment]

As described above, the illumination lens 1 on which light radiated from the light source 5 is incident and which controls distribution of this incident light to emit, has: the incident surface 2 through which light radiated from the light source 5 is incident on the interior of the illumination lens 1; the reflection surface 3 which reflects part of light incident on the interior of the illumination lens 1 from the incidence surface 2, toward the illumination direction; and the emission surface 4 which emits light from the incidence surface 2 and reflection surface 3 toward the illumination direction. Further, the incidence surface 2 has an opening portion 6 which is formed on the side on which light source 5 is arranged such that light from the light source 5 can enter, and the condenser lens surface 9 of the first incidence surface and inside surface 10 of the second incidence surface which are formed in the inner surface of the concave portion 7 dented in a direction opposite to the direction in which the light source 5 is arranged. The condenser lens surface 9 is arranged in the bottom surface of the concave portion 7 and has a convex surface on the light source 5 side to condense light from the light source 5. Further, the inside surface 10 is formed in the concave portion 7 in the surrounding of the optical axis X such that light from the light source 5 can transmit toward the reflection surface 3. The reflection surface 3 is a total reflection surface which totally reflects, toward the illumination direction, light incident on the interior of the illumination lens 1 from the inside surface 10. The emission surface 4 has the condenser lens surface 11 of the first emission surface including the center portion intersecting the optical axis X, and the concave lens surface 12 which is the second emission surface arranged in the surrounding of this condenser lens surface 11 and having refracting power of a different sign from the condenser lens surface 11. Light which is incident from the condenser lens surface 9 is emitted from the condenser lens surface 11, part of light which is reflected on the reflection surface 3 is emitted from the concave lens surface 12 and the other part is emitted from the condenser lens surface 11.

By configuring the illumination lens 1 as described above, it is possible to change the illuminance distribution S3 of the third illumination light L3 to cancel the change of the illuminance distribution S2 of the second illumination light L2 when the light source 5 is moved, and suppress the change of the illuminance distribution S4 in which the first illumination light L1, second illumination light L2 and third illumination light L3 are synthesized small even when the light source 5 is moved back and forth. Consequently, even when an arrangement of the light source 5 is shifted more or less from the arrangement in design, it is possible to provide illumination light of an illuminance distribution which is planned in design.

Further, by configuring the illumination lens 1 as described above, it is possible to adequately change light distribution of the illumination lens 1 by changing only the configuration of the emission surface 4 without changing the configuration of the incidence surface and reflection surface. That is, although it is possible to widen or narrow distribution of illumination light by changing refracting power of the concave lens surface 12, when refracting power of the concave lens surface 12 becomes greater, light which transmits the concave lens surface 12, that is, the beam amount of the second illumination light L2 on the optical axis X side decreases, so that an annular illuminance distribution is likely to be produced. As a result, an annular illuminance distribution is provided in which the illuminance of illumination light emitted from the illumination lens 1 is also entirely high on the periphery side spaced apart from the optical axis X, and the illuminance on the center side of the optical axis X side is low. However, by configuring the illumination lens 1 to generate the third illumination light L3, it is possible to distribute light toward the optical axis X side and, consequently, provide illumination light of an adequate illuminance distribution which is prevented from being annular illuminance distribution.

Consequently, for example, when the illumination lens 1 is molded using a first mold for molding the emission surface 4 and a second mold for molding the reflection surface 3 and incidence surface 2, it is possible to manufacture the illumination lenses 1 of various light distributions only by changing the first mold.

Further, with the illumination lens 1, the relationship between the degrees of the first beam amount (beam amount A) which is the beam amount of the first illumination light L1 incident from the condenser lens surface 9 and emitted from the condenser lens surface 11, the second beam amount (beam amount B) which is the beam amount of the second illumination light L2 totally reflected on the reflection surface 3 and emitted from the concave lens surface 12 and the third beam amount (beam amount C) which is the beam amount of the third illumination light L3 totally reflected on the reflection surface 3 and emitted from the condenser lens surface 11 is second beam amount (beam amount B)> third beam amount (beam amount C)> first beam amount (beam amount A).

By configuring the illumination lens 1 as described above, it is possible to adequately suppress the change of the illuminance distribution S4 which occurs when the position of the light source 5 in the front and back directions with respect to the illumination lens 1 changes.

Further, when beam amount B> beam amount C> beam amount A holds and the beam amount C is equal to or more than 20% and equal to or less than 30% of the sum of the beam amount A, beam amount B and beam amount C, it is possible to adequately suppress the change of the illuminance distribution S4 which occurs when the position of the light source 5 in the front and back directions with respect to the illumination lens 1 changes.

Modified Example

Figure 7:
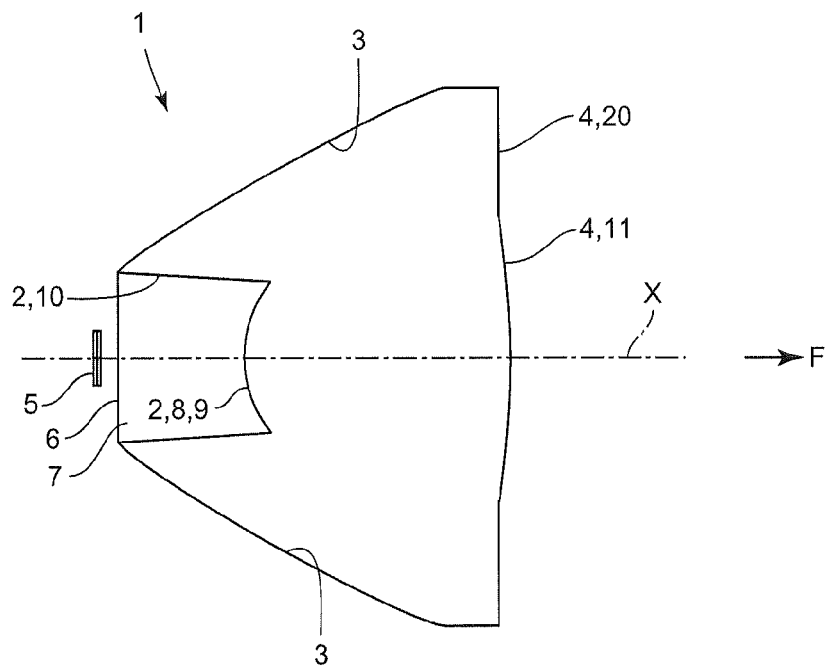
FIG. 7 is a sectional view illustrating a configuration of an illumination lens according to a modified example of the embodiment of the present invention.
Figure 8:
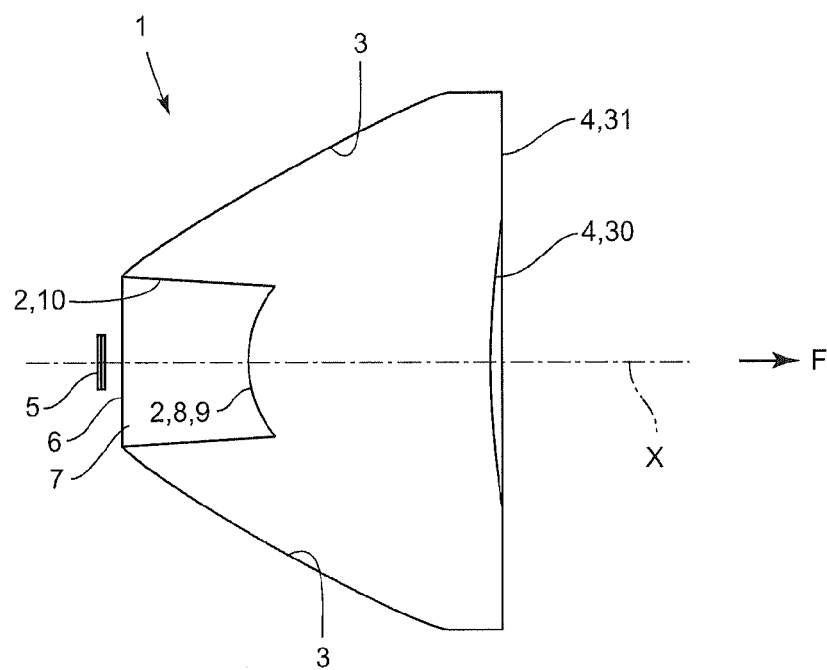
FIG. 8 is a sectional view illustrating a configuration of an illumination lens according to a modified example of the embodiment of the present invention.
Figure 9:
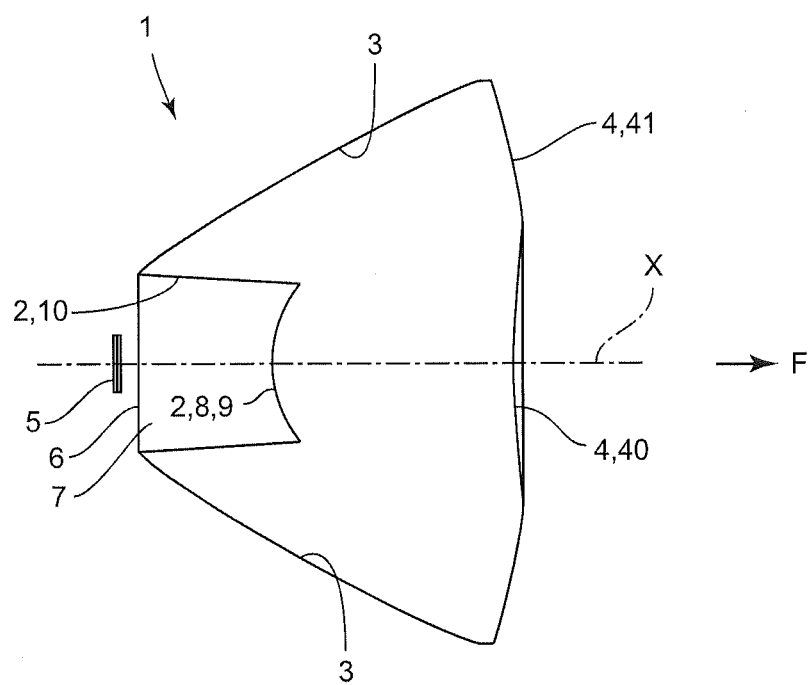
FIG. 9 is a sectional view illustrating a configuration of an illumination lens according to a modified example of the embodiment of the present invention.

FIGS. 7 to 9 illustrate modified examples of the illumination lens 1. In FIGS. 7 to 9, the same components as the members of the illumination lens 1 will be assigned the same reference numerals, and description thereof will not be repeated.

With the illumination lens 1 illustrated in FIG. 7, the second emission surface of the emission surface 4 is formed as a transmission planar surface 20 which is a plane having zero refracting power. Even when this configuration is employed, light which is incident from the condenser lens surface 9 is emitted as the first illumination light L1 from the condenser lens surface 11, part of light which is incident from the inside surface 10 and reflected on the reflection surface 3 is emitted as the second illumination light L2 from the transmission planar surface 20 of the second emission surface and the other part of light is emitted as the third emission light L3 from the condenser lens surface 11, so that it is possible to suppress the change of the illuminance distribution S4 following movement of the light source 5 in the back and forth directions.

With the illumination lens 1 illustrated in FIG. 8, the first emission surface of the emission surface 4 is configured as a concave lens surface 30 having negative refracting power, and the second emission surface is configured as a transmission planar surface 31 which is a planar surface having zero refracting power. Even when this configuration is employed, light which is incident from the condenser lens surface 9 is emitted as the first illumination light L1 from the concave lens surface 30 of the first emission surface, part of light which is incident from the inside surface 10 and reflected on the reflection surface 3 is emitted as the second illumination light L2 from the transmission planar surface 31 of the second emission surface and the other part of light is emitted as the third emission light L3 from the condenser lens surface 30, so that it is possible to suppress the change of the illuminance distribution S4 following movement of the light source 5 in the back and forth directions.

With the illumination lens 1 illustrated in FIG. 9, the first emission surface of the emission surface 4 is configured as a concave lens surface 40 having negative refracting power, and the second emission surface is configured as a condenser lens surface 41 having positive refracting power. Even when this configuration is employed, light which is incident from the condenser lens surface 9 is emitted as the first illumination light L1 from the concave lens surface 40 of the first emission surface, part of light which is incident from the inside surface 10 and reflected on the reflection surface 3 is emitted as the second illumination light L2 from the condenser lens surface 41 of the second emission surface and the other part of light is emitted as the third emission light L3 from the condenser lens surface 41, so that it is possible to suppress the change of the illuminance distribution S4 following movement of the light source 5 in the back and forth directions.

In addition, even when the illumination lens 1 employs the configurations illustrated in FIGS. 7 to 9, the beam amount A of the first illumination light L1, the beam amount B of the second illumination light L2 and the beam amount C of the third illumination light L3 are beam amount B> beam amount C> beam amount A, so that it is possible to adequately suppress the change of the illuminance distribution S4 which occurs following movement of the light source 5 in the front and back directions. Further, beam amount B> beam amount C> beam amount A holds and the beam amount C is equal to or more than 20% and equal to or less than 30% of the sum of the beam amount A, the beam amount B and the beam amount C, it is possible to more adequately suppress the change of the illuminance distribution S4 which occurs following movement of the light source 5 in the back and front directions.

With the illumination lens 1 according to the above embodiments and modified examples, the surface which reflects light totally reflected on the reflection surface 3 among the condenser lens surface 11, concave lens surface 30 and concave lens surface 40 of the first emission surface is preferably formed at the curvature which provides refracting power matching the illuminance distribution required for this light. By this means, it is possible to effectively cancel the changes of the illuminance distributions of the first illumination light L1 and second illumination light L2 following movement of the light source 5 in the front and back directions by using the third illumination light L3 and, consequently, effectively suppress the change of the illuminance distribution S4.

With the illumination lens 1 according to the above embodiments and modified examples, the diameters of the condenser lens surface 11, concave lens surface 30 and concave lens surface 40 of the first emission surface are preferably greater than the diameter of the condenser lens surface 9 of the first incidence surface. By this means, it is possible to reliably emit light incident from the condenser lens surface 9, as the first illumination light L1 from the condenser lens surface 11, concave lens surface 30 and concave lens surface 40 of the first emission surface.

What is claimed is:

1. An illumination lens on which light radiated from a light source is incident and which controls distribution of the incident light to emit, the illumination lens comprising:

an incidence surface through which the light radiated from the light source is incident on an interior of the illumination lens;

a reflection surface which reflects part of the light incident on the interior of the illumination lens from the incidence surface, toward an illumination direction; and an emission surface which emits the light from the incidence surface and the reflection surface, toward the illumination direction, wherein:

the incidence surface comprises an opening portion which is formed on a side on which the light source is arranged such that the light from the light source can enter, and a first incidence surface and a second incidence surface which are formed in an inner surface of a concave portion dented in a direction opposite to a direction in which the light source is arranged;

the first incidence surface is arranged in a bottom surface of the concave portion and comprises a convex surface on the light source side to condense the light from the light source;

the second incidence surface is an inside surface formed in a surrounding of an optical axis of the illumination lens in the convex portion such that the light from the light source can transmit toward the reflection surface;

the reflection surface is a total reflection surface which totally reflects the light incident on the interior of the illumination lens from the second incidence surface, toward the illumination direction;

the emission surface comprises a first emission surface which comprises a center portion intersecting the optical axis, and a second emission surface which is arranged in a surrounding of the first emission surface;

the first emission surface is formed as a concave or convex surface;

a refracting power of light in the second emission surface comprises zero or a different sign from a refracting power of light in the first emission surface;

the light incident from the first incidence surface is emitted from the first emission surface; and part of the light reflected on the reflection surface is emitted from the second emission surface and other part is emitted from the first emission surface, in which a relationship between degrees of a first beam amount which is a beam amount of the light which is incident from the first incidence surface and emitted from the first emission surface, a second beam amount which is a beam amount of the light which is reflected on the reflection surface and emitted from the second emission surface and a third beam amount which is a beam amount of the light which is reflected on the reflection surface and emitted from the first emission surface is second beam amount > third beam amount > first beam amount.

2. The illumination lens according to claim 1, in which the third beam amount is equal to or more than 20% and equal to or less than 30% of a sum of the first beam amount, the second beam amount and the third beam amount.

3. The illumination lens according to claim 1, in which a surface of the first emission surface from which the light reflected on the reflection surface is emitted is formed at a curvature matching an illuminance distribution required for the light.

4. The illumination lens according to claim 1, in which a diameter of the first emission surface is greater than a diameter of the first incidence surface.

* * * * *